Sept. 28, 1926.                                              1,601,210
P. HAAS
INLET VALVE MECHANISM FOR FLUSH TANKS
Filed Feb. 26, 1924        2 Sheets-Sheet 1
Fig.1.
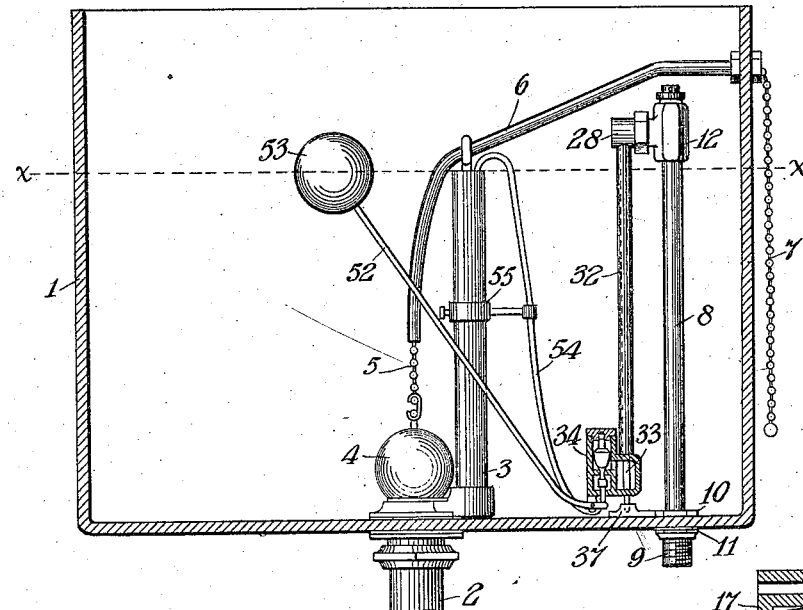
Fig.2.
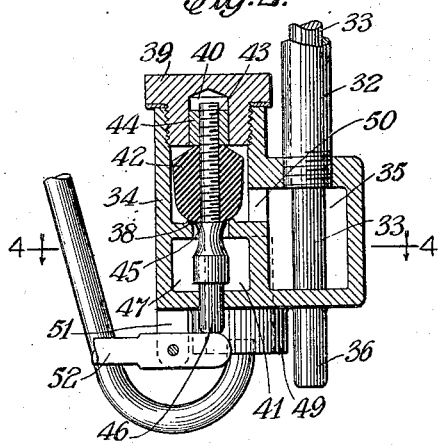
Fig.3.
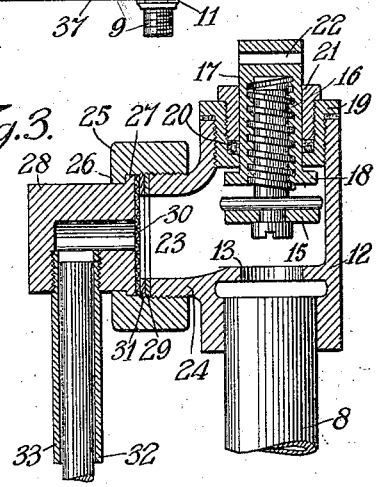
Fig.4.
Fig.5.
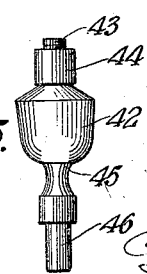
Inventor
Philip Haas
By his Attorney
Louis Provost Whitaker Sept. 28, 1926.
P. HAAS
1,601,210
INLET VALVE MECHANISM FOR FLUSH TANKS
Filed Feb. 26, 1924     2 Sheets-Sheet 2
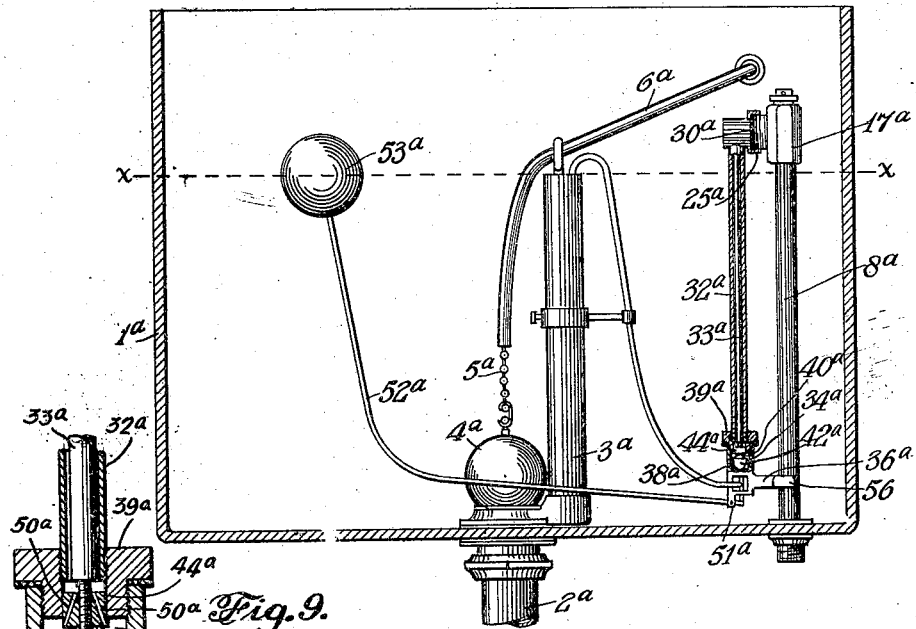
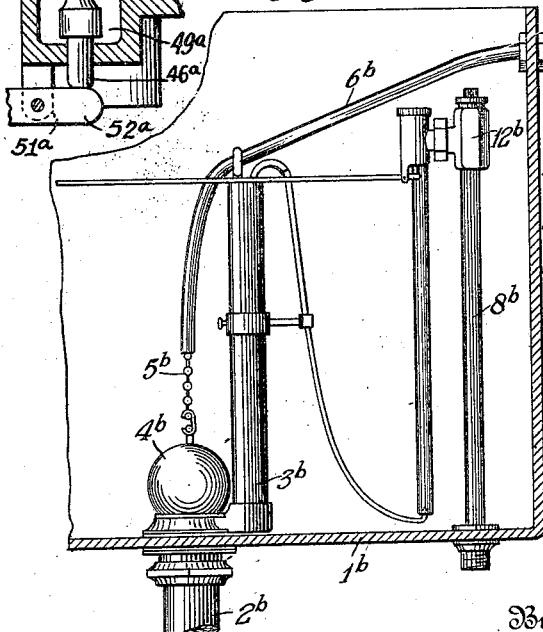
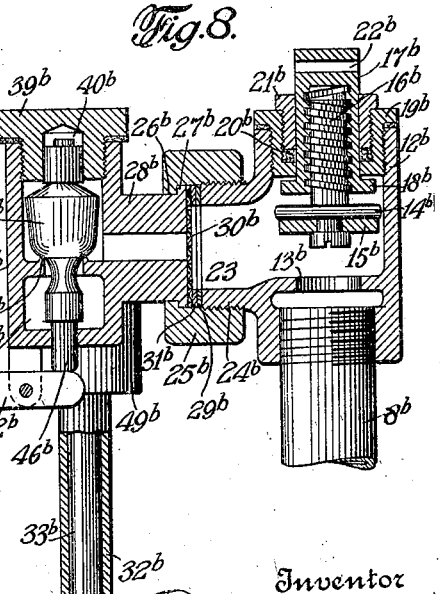
Inventor
Philip Haas
By his Attorney
Louis Prevost Whitaker Patented Sept. 28, 1926.

1,601,210

UNITED STATES PATENT OFFICE.

PHILIP HAAS, OF DAYTON, OHIO.

INLET-VALVE MECHANISM FOR FLUSH TANKS.

Application filed February 26, 1924. Serial No. 695,144.

My invention consists in the novel features hereinafter described, reference being had to the accompanying drawings, which show several forms in which I have contemplated embodying my invention, selected by me for purposes of illustration, and the said invention is fully disclosed in the following description and claims.

Inlet valves for flush tanks as ordinarily constructed are open to a number of objections. They are usually productive of considerable noise due to the rush of water through the tank and as ordinarily made, the supply of water is cut off by means of a float secured to a lever arm, and acting in rising to close the valve so that if, for any reason the valve does not seat properly, a continuous flow of water continues to the tank, resulting in raising the water level above the top of the overflow pipe, and causing it to continually overflow with consequent noise and waste of water, and where the water is metered, a pecuniary loss. These float controlled valves are usually very difficult to get at, ordinarily requiring the services of an expert plumber for the repair of the same, and these valves are frequently allowed to remain in leaky condition by householders, for long periods, with consequent waste of water. The object of my invention is to provide an inlet valve mechanism which, in the first place, will prevent the noisy operation in filling the tank; in which the valve is closed by the pressure of the water in the main and is opened by the descent of the float; in which the valve mechanism and float are readily detachable from the supply pipe, so that they can be removed to repair or adjust the valve; in which a supplementary cut off within the tank and readily accessible above the water level, is provided in the inlet or supply pipe, and in which the float actuated valve itself is readily removable for replacement, examination or repair. In the preferred form of my invention, the means for operating the cut off valve and also the means for disconnecting the float actuated valve are located above the water level, and are most readily accessible. I also prefer to provide a union for connecting the cut off valve with the delivery pipe and float actuated valve, in which a strainer is located in order to prevent the passage of sediment in the water into the chamber containing the float operated valve which might interfere with the proper seating of the same, and by means of the union in which the strainer is preferably located, ready access may be had thereto for cleaning the strainer if this should become necessary.

Referring to the drawings,

Fig. 1 represents a sectional view of a flushing tank provided with one form of inlet valve mechanism embodying my invention.

Fig. 2 is an enlarged sectional view of the float actuated valve and its casing.

Fig. 3 is an enlarged sectional view of the auxiliary cut off valve and the union for connecting it with the delivery pipe and the float actuated valve casing.

Fig. 4 is a horizontal section on line 4—4 of Fig. 2.

Fig. 5 is a detail of the float actuated valve removed from its casing.

Fig. 6 is a view similar to Fig. 1, showing a slight modification of my invention.

Fig. 7 is a partial view of a flushing tank provided with inlet valve mechanism embodying another slight modification of my invention.

Fig. 8 is an enlarged sectional view showing the cut off valve and union connecting it with the float actuated valve and discharge pipe.

Fig. 9 is an enlarged detail sectional view of the inlet valve illustrated in Fig. 6.

Referring to the form of my invention illustrated in Figs. 1 to 5 inclusive, 1, represents the flushing tank provided with the outlet pipe, 2, and overflow pipe, 3, flushing valve 4, which may be of any usual or desired construction. In this instance I have shown the flushing valve in the form of a sphere or ball connected to a chain or flexible connection, 5, extending through a guiding tube, 6, to the exterior of the tank, a portion of the chain or flexible connection depending on the outside of the tank, as indicated at 7, for operating the flushing valve. This particular form of flushing valve mechanism forms no part of my present invention, and will not be particularly described or claimed herein. 8 represents the water inlet pipe which is preferably supported by a fitting, 9, extending through a suitable hole in the tank wall, preferably at the bottom thereof, and secured to the tank, by means of a flange, 10, on the inside of the tank, and a nut, 11, on the exterior, suitable washers being provided beneath the flange, 10, and nut, 11, to make the joint water tight. The pipe, 8, is preferably screw threaded into the fitting, 9, and is supported thereby in a vertical position. The fitting, 9, is connected in the usual manner with the water main or other pipe furnishing the water supply for the tank. The pipe, 8, extends upwardly to or adjacent to the water level, which as indicated in dotted lines at $x$—$x$, will be coincident with the upper edge of the overflow pipe, 3, although any other form of overflow may be employed. At the upper end of the inlet pipe, 8, I prefer to provide a cut off valve casing, indicated at 12, provided with a valve seat, 13, and a cut off valve, 14, provided on its face with a renewable washer, 15, to engage the seat, 13. This valve is preferably carried by a threaded stem, 16, having a coarse thread of steep pitch engaging an interior threaded portion of a sleeve, 17, provided at its lower end with a flange, 18, the said sleeve having an exterior smooth cylindrical face extending through an aperture in a detachable head, 19, threaded into the upper end of the valve casing, 12, and provided with a stuffing box within the same, to receive packing, 20, which is compressed around the sleeve by a follower, 21, to insure a tight joint. The sleeve, 17, is provided at its upper end with suitable means for rotating the same, preferably a horizontal aperture, 22, into which a nail or piece of wire can be inserted so as to rotate the sleeve, and thereby move the cut off valve into closed position. Conventional means are used to prevent rotation of the valve stem and so to compel its reciprocation. The cut off valve casing is also provided with an outlet passage, 23, and a tubular portion, 24, surrounding the same, to receive the interiorly threaded coupling flange, 25. This coupling flange, 25, or follower, is provided at its outer end with an inwardly projecting annular flange, 26, to engage an outwardly projecting flange, 27, on the coupling member, 28, which is closed at its outer end. The coupling member, 28, with the follower, 25, and the threaded portion, 24, of the cut off valve casing forms what is termed in the pipe coupling art, a union, so that by merely unscrewing the follower 25, the parts connected by the flange, 26, can be separated. Within the follower, 25, I employ an annular washer, 29, for making a tight joint between the parts to be coupled, which is preferably located between the end of the part, 24, and the metal washer, 31, of the strainer. The inner end of the coupling, 28, is provided with a strainer, 30, which is preferably soldered or otherwise permanently secured in position between the end face of the flange, 27, and a metal washer, 31.

The coupling member, 28, is provided with a downwardly extending delivery pipe, 32, which preferably has a smaller delivery passage within the same than the transverse area of the inlet pipe, 8, so that the delivery pipe will throttle the water flowing into the tank in addition to conveying it well below the surface of the water and preferably to a point adjacent to the bottom of the tank, to eliminate as far as possible the noise of the inrushing water when the tank is filling. This throttle action may be obtained by using a delivery pipe, 32, of small internal diameter, but I prefer to make the pipe, 32, with a diameter of a size sufficiently large for installations where the water pressure is not excessively high, and to provide it with a detachable internal throttling rod, 33, to adapt the apparatus to situations where the water pressure is sufficiently great to call for further throttling of the pipe, 32. The rod, 33, is an ordinary piece of brass rod which may be obtained in a variety of diameters, and in installing the device a rod, 33, of suitable diameter to produce the desired throttling effect with the water pressure available may be inserted in the pipe, 32, as will be readily understood. The flow of water through the delivery pipe in such case will of course be through the annular space surrounding the rod, 33, within the pipe, 32, and this flow is controlled by a float actuated valve contained in a suitable valve casing or body, indicated at 34, and shown in section, enlarged in Figs. 2 and 4. I prefer to locate this inlet valve adjacent to the bottom of the tank at the lower end of the delivery pipe, 32, as indicated in Fig. 1 (and also in Fig. 6), although it may be located as hereinafter described at the upper end of the delivery pipe, as shown in Fig. 7, where this is desired, but in any case the water passing through the delivery pipe will be delivered adjacent to the bottom of the tank well below the surface of the water in the tank so as to made the operation of the device as noiseless as possible.

The valve casing, 34, is provided with an inlet chamber, 35, provided at its upper end with an internally threaded aperture into which the lower end of the delivery pipe, 32, is screwed. The valve casing, 34, is also preferably provided with a steadying device which, as shown in Figs. 1 and 2, consists of a projection, 36, on the valve casing for engaging a socket, 37, secured to the bottom of the tank in any desired way. For example, the socket, 37, may be formed integrally with the flange, 10, on the fitting, 9, of the inlet pipe. This steadying device supports the delivery pipe, 32, and inlet valve casing and prevents undue strain on the threaded connections at the upper end of the pipe, 32. The valve casing, 34, is provided with an internal valve seat, 38, surrounding an aperture in an internal partition, and the upper end of the casing is internally threaded to receive a cap or closure, 39, provided internally with a guiding aperture, 40. 42 represents a valve which is preferably made of rubber or other suitable material through which passes a threaded valve stem, 43, provided at its upper end with a cylindrical nut, 44, engaging said threaded portion and clamping the valve between said nut, and a shoulder, 45 on the valve stem. The nut, 44, fits with a guiding engagement in the recess, 40, of the cap, 39, and the lower end of the valve stem is provided with an extension, 46, engaging the guiding aperture, 41. and projecting below the bottom of the valve casing. The lower portion of the valve body below the partition in which the valve is seated constitutes a discharge chamber, 47, for the casing, which preferably communicates by passage, 48, with an outlet, 49, discharging downwardly (or laterally if preferred). The inlet chamber, 35, of the valve casing communicates by an orifice, 50, with a portion of the valve casing above the partition in which the valve seat is located. The valve casing is preferably provided with stationary ears, indicated at 51, between which is pivoted the float actuated lever or arm, 52, the end of which engages the lower end of the valve stem extension, 46, while the other end of said rod or lever is provided with a float, 53, of any suitable character which is normally held adjacent to the water level. It is to be noted that the upward movement of the float merely relieves the valve stem from upward pressure, and permits it to seat both by gravity and the downward pressure of the water. When the flushing valve is opened the float will descend as the water level is lowered and the lever, 52, will be caused by the weight of the float to exert an upward pressure on the valve to open it and will hold it open so as to permit the water to run in until the tank has been filled to the proper level and the float thereby raised so as to permit the valve to seat.

According to my preferred construction as illustrated in these figures, both the auxiliary cut off valve and the follower of the union or detachable connection before described are located above the water level and therefore are most readily accessible. This is not absolutely essential, as these parts might be partially or wholly submerged, but it is more convenient and desirable to have them located above the water level as they can be most readily and conveniently reached under those circumstances. If, for any reason, my improved valve mechanism should not operate correctly, anyone, whether a skilled operative or not, can close the auxiliary cut off valve at the top of the pipe, 8, thereby shutting off the supply of water to the tank and by unscrewing the follower, 25, of the union connection, the pipe, 32, inlet valve casing, together with the float valve and float lever can be entirely removed from the tank for examination, adjustment or repair, the steadying projection, 36, being simply lifted out of the socket, 37, at the bottom of the tank. If the inlet valve does not seat properly, the cap, 39, can be removed and the valve withdrawn and repaired, by simply unscrewing the nut, 44, and replacing the valve body, 42, with a new piece of rubber or other suitable material. The valve and cap, 39, are then replaced and the detached parts can be re-inserted in the tank and again coupled by means of the follower, 25, after which the auxiliary inlet valve can be opened, thus restoring the apparatus to operative condition. In order to provide for properly refilling the bowl of the closet for flushing, which may take place so violently as to completely empty the bowl of water, I prefer to provide the elongated S-shaped pipe, 54, supported by a bracket, 55, secured to the over-flow pipe, 3, and having one end in loose engagement with the outlet, 49, of the inlet valve casing, and the other end formed so it will discharge down the overflow pipe, 3, so that as the tank is filled each time after a flushing, a small quantity of water will be driven up the pipe, 54, and discharged through the overflow pipe into the bowl to insure the refilling of the bowl.

In Fig. 6 I have shown a slight modification of the arrangement shown in Figs. 1 to 5 inclusive, in which the inlet valve casing, indicated at $34^a$, is of substantially tubular form open at the top to receive a cap, $39^a$, having a centrally threaded aperture into which the lower end of the delivery pipe, $32^a$, is screwed, the interior of the cap, $39^a$, forming the upper guide, $40^a$ to engage the nut, $44^a$ of the valve, said nut being provided with vertical slots, $50^a$, to permit the passage of the water past said nut. If it is desired to restrict or throttle the interior of the pipe, $32^a$ a throttling rod, $33^a$, may be employed, as indicated in Fig. 6; and this rod may rest on the valve stem or be supported in any other desired manner. Within the valve casing is a central horizontal partition provided with an aperture surrounded by the valve seat, $38^a$, upon which the valve, $42^a$, seats under the combined action of gravity and the pressure of the water, and in this case also by the weight of the throttling rod if the latter is employed. The valve casing is provided below the partition with a lateral outlet $49^a$ discharging into the tank near the bottom thereof. The lower end of the valve casing is provided with the ears, $51^a$, in which is pivoted the float arm, $52^a$, provided at its upper end with the float, $53^a$, the inner end of the float arm engaging the lower end of the valve stem, $46^a$, which projects through an aperture in the bottom of the valve casing. In this instance the valve casing is provided with a slightly different form of steadying device consisting of a horizontal bracket arm, 36ª, having a bifurcated end portion or yoke, 56, extending on the side of the valve casing opposite the side from which the float arm, 52ª, projects and embracing the lower portion of the inlet water pipe, 8ª, thereby supporting the valve casing and the lower end of the delivery pipe, 32ª, against lateral strain the operation of the float and float arm and relieving the threaded connections at the upper end of said pipe from strain. The upper end of the pipe, 32ª, is connected by union coupling, substantially as hereinbefore described, the follower of which is indicated at 25ª, with the auxiliary cut off valve, indicated at 17ª, constructed and operating substantially as hereinbefore described and illustrated in Fig. 3, and these parts need not be again particularly described. The union coupling before referred to will be provided with a strainer, 30ª, as before described and illustrated in Fig. 3. The other parts of the apparatus shown in Fig. 6 are identical with those previously described and illustrated in Fig. 1 and are indicated by the same reference numerals with the addition of the letter "a".

In some instances I find it desirable to arrange the inlet valve at the upper end of the delivery pipe, 32, and preferably above the water level of the tank, as indicated in Figs. 7 and 8, for example. In these figures, 8ᵇ, represents the water inlet pipe, provided at its upper end with the cut off valve, 17ᵇ, the various parts of which are identical with those illustrated in Fig. 3, and here are given the same reference numerals with the letter "b" added. In this instance the valve casing, indicated at 34ᵇ, is provided at one side with an extension, 28ᵇ, in alignment with the inlet passage and terminating in an outwardly projecting flange, 27ᵇ, provided with the strainer, 30ᵇ, metal washer, 31ᵇ, and elastic washer, 29ᵇ, for making a tight joint with the threaded extension, 24ᵇ, of the cut off valve, by means of the follower, 25ᵇ, forming a union coupling therewith, as hereinbefore described. In this instance the valve casing, 34ᵇ, which is of the same general construction as shown and described with reference to Fig. 2, is provided with the cap, 39ᵇ, with the guiding part, 40ᵇ, the valve seat, 38ᵇ, discharge chamber, 47ᵇ, through the bottom of which the valve stem extension, 46ᵇ, projects into engagement with the float operated rod, 52ᵇ, provided with a float, (not shown in these figures), the operation of which will be readily understood. The float actuated rod will in this instance lie in a substantially horizontal position when the float is in raised position and the valve, 52ᵇ, is closed. The valve casing is provided with the lateral discharge chamber, 49ᵇ, into which is screwed the outwardly extending delivery pipe, 32ᵇ, which may or may not be provided with the throttling pin or rod, 33ᵇ, as may be found necessary or desirable. The other parts shown in these figures are identical with those hereinbefore shown and described, and are indicated by the same numerals, with the addition of the letter "b".

In the operation of the valve mechanism shown in Figs. 7 and 8 it will be noted that both the cut off valve and the cap of the inlet valve are above the water level and are very conveniently accessible from the upper part of the tank, so that if it is desired to renew the valve, for example, the auxiliary cut off valve can be closed, the cap 39ᵇ, removed, and the valve taken out for repair, without even wetting the operator's fingers. If it is desirable, the follower, 25ᵇ, can be unscrewed to permit the removal of the inlet valve casing with the attached pipe, 32ᵇ, float rod and float, so that they may be carried to any convenient point for adjustment or repair, and readily replaced by merely screwing up the follower, 25ᵇ.

It will be seen that by the use of any of the forms of my invention herein shown and described the inlet water in filling the tank will be allowed to flow in very slowly, being throttled down where high pressures are employed and discharging adjacent to the bottom of the tank so as to enter the tank with the least possible noise. It will also be noted that the valve is normally held in closed position by its own weight, and by the pressure of the water in the main, and in some instances by the additional weight of the throttling rod, where that is employed above the valve, and rests upon the valve stem so that the seating of the valve is not dependent upon the action of the float, which merely acts when the water level is lowered to raise the valve into open position. This construction also prevents the premature closing of the valve and permits it to slowly take its seat. It will also be noted that the cut off valve and parts forming the union are located preferably above the water line within easy reach of the operator, and are of the utmost simplicity of construction and operation, permitting the closing of the auxiliary cut off valve to prevent the waste of water during repairs, and also the complete detachment of the delivery pipe, inlet valve, float rod and float. This is particularly convenient where the tank itself is not located in a well lighted and convenient position, as the removed parts can be taken to a window or other source of light, or even to a plumber's shop if necessary for adjustment or repair. The apparatus is extremely simple, desirable and efficient, and will operate for a long period without any need of repairs, but the making of repairs, as before described, is a matter of the utmost convenience, and simplicity, and can be readily carried out by any ordinary household without the aid of skilled mechanics and with a minimum of labor, and the parts can be replaced as readily as they can be removed. The apparatus also provides a strainer between the main inlet pipe and the delivery valve mechanism and reduced delivery pipe, thus insuring that the passages through the valve casing and delivery pipe will be free from sediment and the strainer can be cleaned at any time by loosening the follower 25 (or 25a—b) and holding the strainer under a spigot.

What I claim and desire to secure by Letters Patent is:—

1. In a flush tank, the combination with a water inlet pipe extending into the tank to a point adjacent to the upper portion thereof, a water delivery pipe discharging near the bottom of the tank, a float operated valve connected with said delivery pipe, detachable connecting means interposed between the inlet pipe and the delivery pipe, and a throttling rod in the delivery pipe detachably supported with respect to said valve, to provide a throttling passage between said rod and the inner surface of the pipe, whereby said throttling rod may be removed and replaced by another of different diameter.

2. In a flush tank, the combination with a water inlet pipe extending into the tank to a point adjacent to the upper portion thereof, a water delivery pipe discharging adjacent to the bottom of the tank, a float operated valve connected with said delivery pipe adjacent to its lower end, a connection uniting the inlet pipe and delivery pipe at their upper ends, and steadying means cooperating with the lower end of the casing of the float operated valve, to relieve said connection at the upper ends of said pipes from strain due to the operation of the float operated valve.

3. In a flush tank, the combination with a water inlet pipe extending into the tank to a point adjacent to the upper portion thereof, a water delivery pipe discharging adjacent to the bottom of the tank, a float operated valve connected with said delivery pipe adjacent to its lower end, a detachable connection uniting the inlet pipe and delivery pipe at their upper ends, and steadying means, including a stationary part rigidly connected with respect to the tank and inlet pipe, said stationary part and the lower portion of the casing of the float operated valve being provided the one with a recess and the other with a projection for detachably engaging in said recess, to relieve the connection at the upper ends of said pipes from strain in the operation of the float operated valve, said projection and recess being held against accidental disengagement by said connection at the upper ends of said pipes.

4. In a flushing tank, the combination with a water inlet pipe extending into the tank to a point adjacent to the upper portion thereof, a vertically disposed water delivery pipe discharging adjacent to the bottom of the tank and provided at its lower end with an inlet valve casing, a valve in said casing, a float rod pivoted to said casing for moving the valve in a direction to open it, a float connected to said rod, a union coupling connecting the inlet pipe and delivery pipe at their upper adjacent ends, and means adjacent to the bottom of the tank for supporting said delivery pipe and valve casing against lateral movement.

5. In a flushing tank, the combination with a water inlet pipe extending into the tank to a point adjacent to the upper portion thereof, a vertically disposed water delivery pipe discharging adjacent to the bottom of the tank and provided at its lower end with an inlet valve casing, a valve in said casing, a float rod pivoted to said casing for moving the valve in a direction to open it, a float connected to said rod, a union coupling connecting the inlet pipe and delivery pipe at their upper adjacent ends, and means adjacent to the bottom of the tank for supporting said delivery pipe and valve casing against lateral movement, said valve casing having a removable cap to permit the removal and repair of the valve.

6. In a flushing tank, the combination with a water inlet pipe extending into the tank to a point adjacent to the upper portion thereof, a vertically disposed water delivery pipe discharging adjacent to the bottom of the tank and provided at its lower end with an inlet valve casing, a valve in said casing, a float rod pivoted to said casing for moving the valve in a direction to open it, a float connected to said rod, a union coupling connecting the inlet pipe and delivery pipe at their upper adjacent ends, and means adjacent to the bottom of the tank for supporting said delivery pipe and valve casing against lateral movement, said valve casing being provided with a removable cap having a portion forming the upper guide for the valve stem, the valve casing being provided with a lower guide for the valve stem, said valve having a stem detachably engaging said guides.

7. In a flushing tank, the combination with a water inlet pipe extending into the tank to a point adjacent to the upper portion thereof, a vertically disposed water delivery pipe discharging adjacent to the bottom of the tank and provided at its lower end with an inlet valve casing, a valve in said casing, a float rod pivoted to said casing for moving the valve in a direction to open it, a float connected to said rod, a union coupling connecting the inlet pipe and delivery pipe at their upper adjacent ends, and means adjacent to the bottom of the tank for supporting said delivery pipe and valve casing against lateral movement, said valve casing being provided with a removable cap having a portion forming the upper guide for the valve stem, the valve casing being provided with a lower guide for the valve stem, said valve having a detachable stem engaging said guides, and a throttling rod in the delivery pipe extending longitudinally thereof.

In testimony whereof I affix my signature.

PHILIP HAAS.